US012639237B2

(12) United States Patent
Yu et al.

(10) Patent No.: US 12,639,237 B2
(45) Date of Patent: *May 26, 2026

(54) MEMORY DEVICE WITH INTERNAL PROCESSING INTERFACE

(71) Applicant: SAMSUNG ELECTRONICS CO., LTD., Suwon-si (KR)

(72) Inventors: Hak-soo Yu, Hanam-si (KR); Shinhaeng Kang, Suwon-si (KR); Yuhwan Ro, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/819,544

(22) Filed: Aug. 29, 2024

(65) Prior Publication Data

US 2024/0419612 A1     Dec. 19, 2024

Related U.S. Application Data

(63) Continuation of application No. 17/591,928, filed on Feb. 3, 2022, now Pat. No. 12,099,455.

(30) Foreign Application Priority Data

Mar. 11, 2021     (KR) ........................ 10-2021-0032095

(51) Int. Cl.
  *G06F 13/16*        (2006.01)
  *G06F 9/30*         (2018.01)
        (Continued)

(52) U.S. Cl.
  CPC ........ *G06F 13/1668* (2013.01); *G06F 9/3016* (2013.01)

(58) Field of Classification Search
  CPC . G06F 9/3016; G06F 15/7821; G06F 13/1668
        (Continued)

(56) References Cited

U.S. PATENT DOCUMENTS 6,507,215 B1 *  1/2003  Piasecki .............. G06F 13/4072
                                                326/39
7,818,541 B2   10/2010  Rhoades et al.
        (Continued)

FOREIGN PATENT DOCUMENTS

KR     10-2020-0013461 A     2/2020
KR     10-2020-0108772 A     9/2020
KR     10-2020-0108773 A     9/2020

OTHER PUBLICATIONS

High Bandwidth Memory DRAM (HBM1, HBM2) (JESD235C), Mar. 24, 2020.
        (Continued)

*Primary Examiner* — Chun Kuan Lee
(74) *Attorney, Agent, or Firm* — Morgan, Lewis & Bockius LLP

(57)                 ABSTRACT

A memory device includes a processor in memory (PIM) circuit including an internal processor configured to perform an internal processing operation, and an interface circuit connected to the PIM circuit, wherein the interface circuit includes a command address decoder configured to decode a command and an address received through first pins to generate an internal command, a second pin configured to receive a voltage signal relating to a control of a PIM operation mode, and a command mode decoder configured to generate at least one command mode bit (CMB) based on the internal command and the voltage signal, and the interface circuit outputs internal control signals to the PIM circuit based on the at least one CMB to control the internal processing operation of the PIM circuit.

20 Claims, 14 Drawing Sheets

(51) Int. Cl.

| | | |
|---|---|---|
| *G06F 13/38* | (2006.01) | |
| *G06F 13/40* | (2006.01) | |
| *G06F 15/78* | (2006.01) | |
| *G11C 7/18* | (2006.01) | |
| *G11C 8/14* | (2006.01) | |

(58) Field of Classification Search

USPC ........................................................ 710/308

See application file for complete search history.

(56) References Cited

U.S. PATENT DOCUMENTS

| | | | |
|---|---|---|---|
| 10,152,271 B1 | 12/2018 | Willcock | |
| 10,346,092 B2 | 7/2019 | Lea et al. | |
| 10,416,896 B2 | 9/2019 | O et al. | |
| 10,592,467 B2 | 3/2020 | Ryu et al. | |
| 2006/0133417 A1 | 6/2006 | Cheng et al. | |
| 2008/0079148 A1* | 4/2008 | Leung ........................ | G06F 1/22 257/734 |
| 2016/0293232 A1 | 10/2016 | Ishizu et al. | |
| 2017/0213581 A1 | 7/2017 | Kim et al. | |
| 2017/0344301 A1 | 11/2017 | Ryu et al. | |
| 2018/0032437 A1 | 2/2018 | Stocksdale et al. | |
| 2018/0047432 A1 | 2/2018 | Kondo et al. | |
| 2019/0065082 A1 | 2/2019 | Penney et al. | |
| 2020/0294558 A1 | 9/2020 | Yu et al. | |
| 2020/0387466 A1* | 12/2020 | Curtis ................. | G06F 13/4022 |
| 2021/0134345 A1 | 5/2021 | Kwon et al. | |
| 2021/0223996 A1 | 7/2021 | Song | |
| 2022/0044500 A1* | 2/2022 | Yang ....................... | H04L 67/12 |
| 2022/0292033 A1 | 9/2022 | Yu et al. | |

OTHER PUBLICATIONS

Notice of Allowance dated Jun. 3, 2024 in corresponding U.S. Appl. No. 17/591,928.

Final Office Action dated Feb. 7, 2024 in corresponding U.S. Appl. No. 17/591,928.

Office Action dated Oct. 5, 2023 in corresponding U.S. Appl. No. 17/591,928.

Notice of Allowance issued Nov. 24, 2025 in corresponding Korean Patent Application No. 10-2021-0032095.

* cited by examiner

| | RFU | Pre-defined Row Command/Address Sequence | CMB[0] | CMB[1] | CMB[2] | CMB[3] | CMB[4] |
|---|---|---|---|---|---|---|---|
| Command Mode 1 | H | Don't care | L | L | L | L | H |
| Command Mode 2 | L | Match | H | H | H | H | H |

| Row Command | Symbol | Clock Cycle | R0 | R1 | R2 | R3 | R4 | R5 | R6 | R7 | R8 | R9 |
|---|---|---|---|---|---|---|---|---|---|---|---|---|
| Row No Operation | RNOP | R or F | H | H | H | H | V | V | V | V | V | V |
| Activate(1 Bank) | ACT | R | L | H | H | PC | SID0/V | SID1/V | BA0 | BA1 | BA2 | BA3 |
| | | F | H | H | RA8 | RA9 | RA10 | RA11 | RA12 | RA13/V | RA14/V | RA15/V |
| | | R | H | H | RA0 | RA1 | RA2 | RA3 | RA4 | RA5 | RA6 | RA7 |
| Precharge | PREpb | R or F | H | L | L | PC | SID0/V | SID1/V | BA0 | BA1 | BA2 | BA3 |
| Precharge All | PREab | R or F | L | L | H | PC | V | V | V | V | V | V |
| Per-Bank Refresh | REFpb | R | L | L | L | PC | SID0/V | SID1/V | BA0 | BA1 | BA2 | BA3 |
| All-Bank Refresh | REFab | R | L | H | L | PC | V | V | V | V | L | V |
| Per-Bank Refresh Management | FRMpb | R | L | H | H | PC | SID0/V | SID1/V | BA0 | BA1 | BA2 | BA3 |
| All-Bank Refresh Management | FRMab | R | H | L | L | PC | V | V | V | V | H | V |
| Power-Down Entry | PDE | R | L | H | L | H | V | V | V | V | V | V |
| | | F | L | H | L | H | V | V | V | V | V | V |
| Self Refresh Entry | SRE | R | L | H | L | L | V | V | V | V | V | V |
| | | F | L | H | L | L | V | V | V | V | V | V |
| Power-Down & Self Refresh Exit | PDX/SRX | R | H | H | H | H | V | V | V | V | V | V |

600b

| Row Command | Symbol | Clock Cycle | R0 | R1 | R2 | R3 | R4 | R5 | R6 | R7 | R8 | R9 | Note |
|---|---|---|---|---|---|---|---|---|---|---|---|---|---|---|
| Row No Operation | RNOP | R or F | H | H | H | H | V | V | V | V | V | V |  |
| Activate(1 Bank) | ACT | R | L | H | H | PC | SID0/V | SID1/V | BA0 | BA1 | BA2 | BA3 | pair with PREpb |
|  |  | F | H | H | RA8 | RA9 | RA10 | RA11 | RA12 | RA13/V | RA14/V | RA15/V |  |
|  |  | R | H | H | RA0 | RA1 | RA2 | RA3 | RA4 | RA5 | RA6 | RA7 |  |
| Activate a Quarter of All Banks for PIM Operation Mode Entry | ACTQP | R | L | H | H | PC | SID0/V | SID1/V | BA0 | BA1 | V | V | pair with PREqbp — 602b |
|  |  | F | L | H | RA8 | RA9 | RA10 | RA11 | RA12 | RA13/V | RA14/V | RA15/V |  |
|  |  | R | H | H | RA0 | RA1 | RA2 | RA3 | RA4 | RA5 | RA6 | RA7 |  |
| Activate a Half of All Banks for PIM Operation Mode Entry | ACTHP | R | L | L | H | PC | SID0/V | SID1/V | BA0 | V | V | V | pair with PREhbp |
|  |  | F | H | H | RA8 | RA9 | RA10 | RA11 | RA12 | RA13/V | RA14/V | RA15/V |  |
|  |  | R | H | H | RA0 | RA1 | RA2 | RA3 | RA4 | RA5 | RA6 | RA7 |  |
| Activate All Banks for PIM Operation Mode Entry | ACTAP | R | L | L | H | PC | SID0/V | SID1/V | BA0 | V | V | V | pair with PREabp |
|  |  | F | L | H | RA8 | RA9 | RA10 | RA11 | RA12 | RA13/V | RA14/V | RA15/V |  |
|  |  | R | H | H | RA0 | RA1 | RA2 | RA3 | RA4 | RA5 | RA6 | RA7 |  |
| Precharge | PREpb | R or F | H | L | L | PC | SID0/V | SID1/V | BA0 | BA1 | BA2 | BA3 | pair with ACT |
| Precharge a Quarter of All Banks for PIM Operation Mode Exit | PREqbp | R or F | H | L | L | PC | SID0/V | SID1/V | BA0 | BA1 | V | V | pair with ACTQP — 604b |
| Precharge a Half of All Banks for PIM Operation Mode Exit | PREhbp | R or F | H | L | L | PC | SID0/V | SID1/V | BA0 | V | V | V | pair with ACTHP |
| Precharge All Banks for PIM Operation Mode Exit | PREabp | R or F | H | L | L | PC | SID0/V | SID1/V | V | V | V | V | pair with ACTAP |
| Precharge All | PREab | R or F | H | L | L | PC | V | V | V | V | V | V |  |
| Per-Bank Refresh | REFpb | R | H | L | L | PC | SID0/V | SID1/V | BA0 | BA1 | BA2 | BA3 |  |
| All-Bank Refresh | REFab | R | H | H | L | PC | V | V | V | V | L | V |  |
| Per-Bank Refresh Management | FRMpb | R | L | L | H | PC | SID0/V | SID1/V | BA0 | BA1 | BA2 | BA3 |  |
| All-Bank Refresh Management | FRMab | R | H | H | L | H | V | V | V | H | V | V |  |
| Power-Down Entry | PDE | R | H | H | L | H | V | V | V | V | V | V |  |
|  |  | F | L | H | L | L | V | V | V | V | V | V |  |
| Self Refresh Entry | SRE | R | L | H | L | L | V | V | V | V | V | V |  |
|  |  | F | L | H | L | L | V | V | V | V | V | V |  |
| Power-Down& Self Refresh Exit | PDX/SRX | R | H | H | H | H | V | V | V | V | V | V |  |

| Column Command | Symbol | Clock Cycle | C0 | C1 | C2 | C3 | C4 | C5 | C6 | C7 |
|---|---|---|---|---|---|---|---|---|---|---|
| Column No Operation | CNOP | R | H | H | H | V | V | V | V | V |
| | | F | V | V | V | V | V | V | V | V |
| Read | RD | R | H | L | H | L | PC | SID0/V | SID1/V | BA0 |
| | | F | BA1 | BA2 | BA3 | CA0 | CA1 | CA2 | CA3 | CA4 |
| Read with Auto-Precharge | RDA | R | H | L | H | H | PC | SID0/V | SID1/V | BA0 |
| | | F | BA1 | BA2 | BA3 | CA0 | CA1 | CA2 | CA3 | CA4 |
| Write | WR | R | H | L | L | L | PC | SID0/V | SID1/V | BA0 |
| | | F | BA1 | BA2 | BA3 | CA0 | CA1 | CA2 | CA3 | CA4 |
| Write with Auto-Precharge | WRA | R | H | L | L | H | PC | SID0/V | SID1/V | BA0 |
| | | F | BA1 | BA2 | BA3 | CA0 | CA1 | CA2 | CA3 | CA4 |
| Mode Register Set | MRS | R | L | L | L | MA4 | OP5 | OP6 | OP7 | MA0 |
| | | F | MA1 | MA2 | MA3 | OP0 | OP1 | OP2 | OP3 | OP4 |
| Mode Register Read | MRR | R | L | L | H | MA4 | V | V | V | MA0 |
| | | F | MA1 | MA2 | MA3 | V | V | V | V | V |

| Column Command | Symbol | Clock Cycle | C0 | C1 | C2 | C3 | C4 | C5 | C6 | C7 | C8 (RFU) | Note |
|---|---|---|---|---|---|---|---|---|---|---|---|---|
| Column No Operation | CNOP | R | H | H | H | V | V | V | V | V | V | |
| | | F | V | V | V | V | V | V | V | V | V | |
| Read | RD | R | H | L | H | L | PC | SID0/V | SID1/V | BA1 | L | |
| | | F | BA1 | BA2 | BA3 | CA0 | CA1 | CA2 | CA3 | CA4 | L | |
| ReadP | RDP | R | H | L | H | L | PC | SID0/V | SID1/V | BA0 | H | RL |
| | | F | BA1 | BA2 | BA3 | CA0 | CA1 | CA2 | CA3 | CA4 | H | |
| Read with Auto-Precharge | RDA | R | H | L | H | H | PC | SID0/V | SID1/V | BA0 | L | |
| | | F | BA1 | BA2 | BA3 | CA0 | CA1 | CA2 | CA3 | CA4 | L | |
| Write | WR | R | H | L | L | L | PC | SID0/V | SID1/V | BA0 | L | |
| | | F | BA1 | BA2 | BA3 | CA0 | CA1 | CA2 | CA3 | CA4 | L | |
| WriteP | WRP | R | H | L | L | L | PC | SID0/V | SID1/V | BA0 | H | WL |
| | | F | BA1 | BA2 | BA3 | CA0 | CA1 | CA2 | CA3 | CA4 | H | |
| Write with Auto-Precharge | WRA | R | H | L | L | H | PC | SID0/V | SID1/V | BA1 | L | |
| | | F | BA1 | BA2 | BA3 | CA0 | CA1 | CA2 | CA3 | CA4 | L | |
| Mode Register Set | WRS | R | L | L | L | MA4 | OP5 | OP6 | OP7 | MA0 | V | |
| | | F | MA1 | MA2 | MA3 | OP0 | OP1 | OP2 | OP3 | OP4 | V | |
| Mode Register Read | WRR | R | L | L | H | MA4 | V | V | V | MA0 | V | |
| | | F | MA1 | MA2 | MA3 | V | V | V | V | V | V | |
| PIMRead | PIMR | R | L | H | L | PC | SID0/V | SID1/V | BA1 | H | CCDL Cycle |
| | | F | V | V | CA0 | CA1 | CA2 | CA3 | CA4 | H | |
| PIMWrite | PIMW | R | L | H | L | PC | SID0/V | SID1/V | BA1 | H | CCDL Cycle |
| | | F | V | V | CA0 | CA1 | CA2 | CA3 | CA4 | H | |

702b

704b

706b

708b

800

Start

Activate BA0 & RA0x27FF —— S802

Activate BA1 & RA0x27FF —— S804

Activate BA8 & RA0x27FF —— S806

Activate BA9 & RA0x27FF —— S808

PIM Operation Mode Entry —— S809

Activate BA0 & RA0x3FFF —— S810

Datapath/PU control —— S811

Activate BA0 & RA0x2FFF —— S812

Activate BA1 & RA0x2FFF —— S814

PIM Operation Mode Exit —— S815

End

MEMORY DEVICE WITH INTERNAL PROCESSING INTERFACE

CROSS-REFERENCE TO RELATED APPLICATIONS

This U.S. non-provisional patent application is a continuation of co-pending U.S. patent application Ser. No. 17/591,928, titled MEMORY DEVICE WITH INTERNAL PROCESSING INTERFACE and filed on Feb. 3, 2022, which, in turn, claims priority under 35 U.S.C. § 119 to Korean Patent Application No. 10-2021-0032095, filed on Mar. 11, 2021, in the Korean Intellectual Property Office, the disclosures of which are incorporated by reference herein in their entireties.

TECHNICAL FIELD

The present disclosure relates to a memory device, and more particularly, to a memory device for performing internal processing and a method of operating the memory device.

DISCUSSION OF RELATED ART

Semiconductor memory devices used in high-performance electronic systems may provide increased capacity and/or speed. A memory device may store various types of information such as data, and may store various types of arithmetic processing such as neural network arithmetic or arithmetic processing results. A processor in memory (PIM) type of memory device may be provided to perform some arithmetic operations of a computing system, providing large-capacity arithmetic and memory capabilities as internal processing.

A PIM circuit may perform various types of arithmetic operations using externally provided data and information stored in the memory device, the internal processing of the memory device may reduce an arithmetic operation burden of the computing system, and the memory performance of the memory device may be increased. However, hardware configurations and/or implementations of the memory device may be complicated or difficult because a separate interface for the internal processing is used, and a cost for supporting internal processing operations may be increased.

SUMMARY

The present disclosure provides a memory device that performs an internal processing operation by using an interface having a plurality of memory protocols, an operation method thereof, and a memory system including the same.

According to an embodiment, a memory device includes a processor in memory (PIM) circuit having an internal processor configured to perform an internal processing operation, and an interface circuit connected to the PIM circuit, wherein the interface circuit includes a command address decoder configured to decode a command and an address received through first pins to generate an internal command, a second pin configured to receive a voltage signal relating to control of a PIM operation mode, and a command mode decoder configured to generate at least one command mode bit (CMB) based on the internal command and the voltage signal, and wherein the interface circuit is configured to control the internal processing operation of the PIM circuit by outputting internal control signals to the PIM circuit based on the CMB.

According to an embodiment, a memory device includes a processor in memory (PIM) circuit including an internal processor configured to perform an internal processing operation; and an interface circuit, connected to the PIM circuit, configured to decode a command and an address received through first pins, and configured to generate internal control signals for controlling the PIM circuit based on the command and the address and a voltage signal received through a second pin, wherein, in a case where the command and the address have a first pattern, the memory device enters a PIM operation mode when the voltage signal has a first value, and the memory device enters a normal operation mode when the voltage signal has a second value.

According to an embodiment, a memory device includes a processor in memory (PIM) circuit including an internal processor configured to perform an internal processing operation; and an interface circuit connected to the PIM circuit, wherein the interface circuit comprises: a command address decoder configured to decode a command and an address received through a first pin to generate an internal command; and a command mode decoder configured to determine whether the command and the address correspond to a predefined row command/address sequence, and configured to generate at least one command mode bit (CMB) based on the internal command according to the determination result, and wherein the interface circuit is configured to control the internal processing operation of the PIM circuit in a PIM operation mode based on the at least one CMB according to the determination result.

BRIEF DESCRIPTION OF THE DRAWINGS

Embodiments of the present disclosure may be more clearly understood from the following detailed description taken in conjunction with the accompanying drawings, in which:

FIG. 2 is a block diagram illustrating a memory device that performs an internal processing operation according to an embodiment of the present disclosure;

FIG. 5 is a tabular diagram illustrating an example of a command mode truth table for an operation of a command mode decoder of FIG. 3;

FIGS. 6A and 6B are tabular diagrams illustrating row command truth tables according to embodiments of the present disclosure;

FIGS. 7A and 7B are tabular diagrams illustrating column command truth tables according to embodiments of the present disclosure;

DETAILED DESCRIPTION

Hereinafter, embodiments of the present disclosure will be described in detail with reference to the accompanying drawings.

Figure 1A:
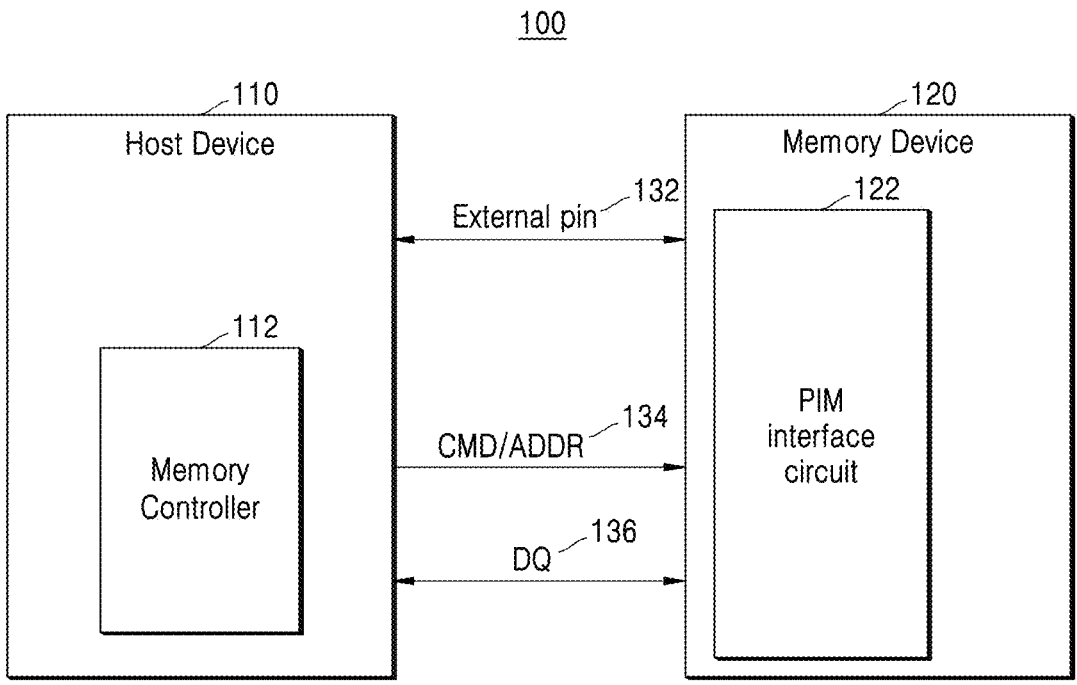
FIGS. 1A to 1C are block diagrams illustrating a memory system including a memory device that performs an internal processing operation according to embodiments of the present disclosure.
Figure 1B:
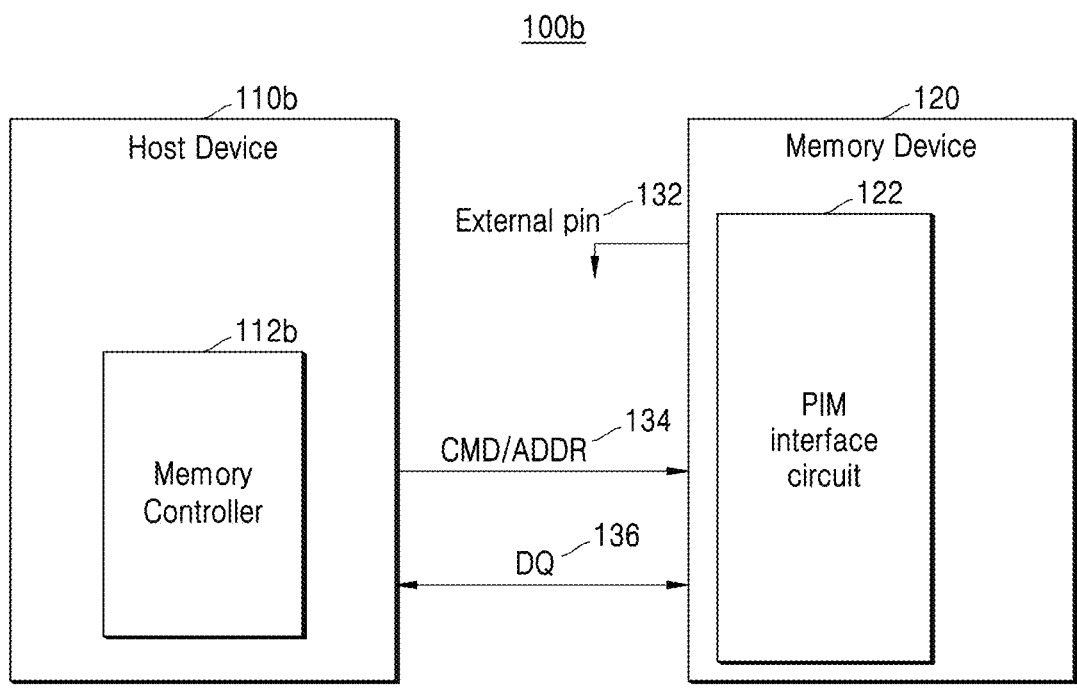
Figure 1C:
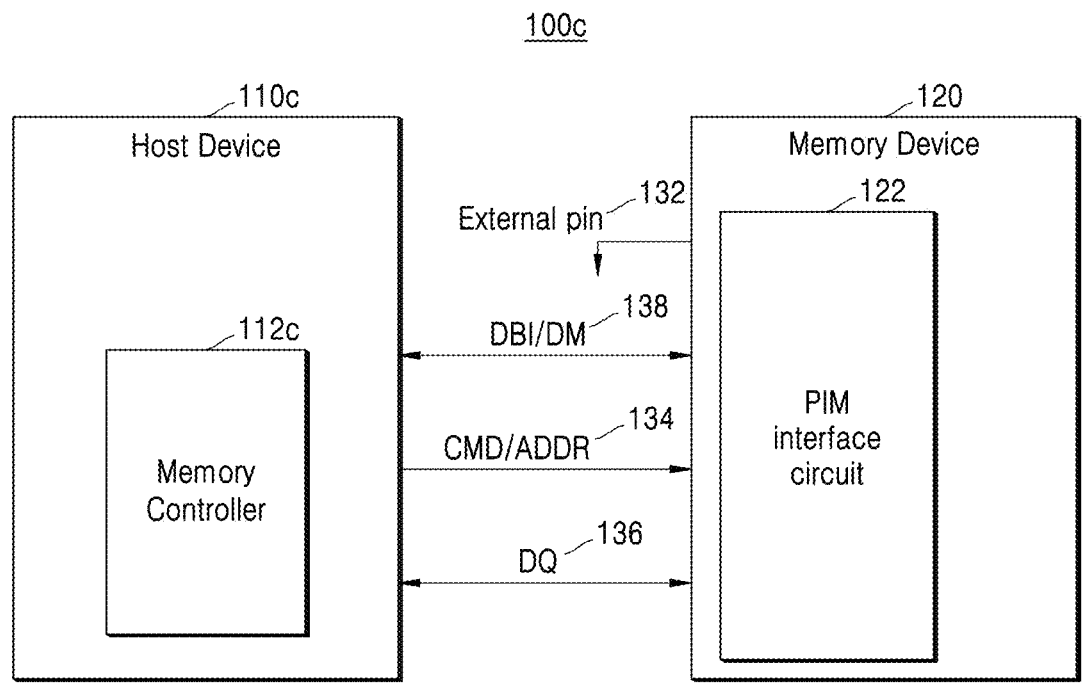

FIGS. 1A to 1C illustrate a memory system including a memory device that performs internal processing operations according to embodiments of the present disclosure;

Referring to FIGS. 1A to 1C, a memory system 100, 100b or 100c may include a host device 110, 110b or 110c, respectively, and a memory device 120. The host device 110, 110b or 110c may be communicatively connected to the memory device 120 through at least command/address signal lines 134 and data lines 136.

Although the command/address signal lines 134 and the data lines 136 are illustrated as being connected by one signal line between the host device 110, 110b or 110c and the memory device 120 for the sake of brevity of the drawings, the command/address signal lines 134 and the data lines 136 may be respectively connected through a plurality of signal lines.

Some examples may use expressions "connected" and/or "coupled" along with derivatives thereof. The terms are not necessarily intended as synonyms for each other. For example, descriptions using the terms "connected" and/or "coupled" may indicate two or more elements in direct physical or electrical contact with each other. Moreover, the terms "connected" and/or "coupled" may indicate that two or more elements are not in direct contact with each other but still cooperate or interact with each other such as via radio-frequency, electromagnetic or other wireless communication, without limitation.

The host device 110, 110b or 110c may include, for example, a computing system such as a computer, a notebook computer, a server, a workstation, a portable communication terminal, a personal digital assistant (PDA), a portable multimedia player (PMP), a smartphone, or a wearable device. Alternatively, the host device 110, 110b or 110c may be part of components included in a computing system such as a graphics card.

The host device 110, 110b or 110c may include a functional block that performs a computer operation in the memory system 100 and may include a central processing unit (CPU), a digital signal processor (DSP), a graphics processing unit (GPU), or an application processor (AP). In addition, the host device 110, 110b or 110c may include a memory controller 112, 112b or 112c, respectively, that manages data transmission to and data reception from the memory device 120.

The host device 110, 110b or 110c may control the memory device 120 through the memory controller 112, 112b or 112c, respectively. The memory controller 112, 112b or 112c, respectively, controls the memory device 120, but embodiments of the present disclosure are not limited thereto. For example, the memory controller may be provided outside of the host device, and the host device may control the memory device 120.

The memory controller 112, 112b or 112c, respectively, may access the memory device 120 according to a memory request from the host device 110, 110b or 110c, respectively. The memory controller 112, 112b or 112c, respectively, may generate information related to a certain address for physically or logically classifying memory cells 206 (FIG. 2) of the memory device 120 or commands that the memory device 120 may recognize. For example, the certain address may include at least one of a bank address, a row address, and a column address, and the commands may each include an active command for selecting a row address of a certain bank to activate a certain word-line during a command mode for operating a normal memory such as during a normal operation mode, a read command for reading data of a certain address of memory cells, a write command for writing data to a certain address of memory cells, a precharge command for precharging a bit-line, or the like. According to an embodiment of the present disclosure, during the command mode for operating a processor in memory (PIM) such as during a PIM operation mode, the commands may include an activation command for a PIM, a read/write command for the PIM, a precharge command for the PIM, and the like.

The memory controller 112, 112b or 112c, respectively, may perform an operation of selecting a row and a column corresponding to a memory location, an operation of writing data to the memory location, and an operation of reading the written data written with respect to the memory device 120 through an interface. Referring to FIG. 1A, the memory device 120 may include a PIM interface circuit 122 and may be connected to the memory controller 112, 112b or 112c, respectively, or the host device 110, 110b or 110c, respectively, through the PIM interface circuit 122.

The memory controller 112, 112b or 112c, respectively, may provide a command CMD and an address ADDR to the memory device 120 through the command/address signal lines 134, thereby controlling a write operation or a read operation on the memory device 120. In addition, data for a write operation and read data may be transmitted/received between the memory controller 112, 112b or 112c, respectively, and the memory device 120 through data lines 136.

The memory device 120 may write data or read data under the control of the memory controller 112, 112b or 112c, respectively. For example, the memory device 120 may include a high-bandwidth memory (HBM) device. However, the scope of the present disclosure is not limited thereto, and the memory device 120 may include any one or more of volatile memory devices such as double data rate (DDR) synchronous dynamic random-access memory (SDRAM), low power double data rate (LPDDR) SDRAM, graphics double data rate (GDDR) SDRAM, wide input/output (I/O) dynamic random-access memory (DRAM), and hybrid memory cube (HMC). According to an embodiment, the memory device 120 may include any one or more of non-volatile memory devices such as flash memory, phase-change random-access memory (PRAM), magnetic RAM (MRAM), resistive RAM (RRAM), and ferroelectric RAM (FRAM). The memory device 120 described below with reference to FIG. 4 corresponds to the case where the memory 120 corresponds to HBM.

According to an embodiment, the memory device 120 may alternately operate in a normal operation mode and a PIM operation mode. The normal operation mode refers to an operation mode in which a general data transaction operation is performed, and the PIM operation mode may be an operation mode in which an internal processing operation is performed by a PIM circuit. In order to efficiently operate the PIM circuit, communication protocol support between the memory controller 112 and the memory device 120 is required. A memory device (for example, DRAM) of the related art supports a protocol for operation in a normal operation mode and does not support a protocol for a command capable of operating an internal processing unit.

The memory device 120 according to an embodiment of the present disclosure may include a plurality of communication protocols and recognize a communication protocol suitable for each memory system according to various system environments to drive the PIM circuit.

Referring to FIG. 1A, one of the various system environments may include the memory system 100 including the memory controller 112 capable of using an external pin 132 to recognize a communication protocol for an operation of the PIM circuit. The memory device 120 may include connectors for being connected to the memory controller 112, and the connectors may be provided as pins, balls, signal lines, or other hardware components.

The memory system 100 according to the embodiment of FIG. 1A may include the memory device 120 including the separate external pin 132, and the memory controller 112 that supports use of the external pin 132 to operate the PIM circuit and generates and provides a PIM command. The PIM command may indicate a command configured to operate the PIM circuit in a PIM operation mode.

Referring to FIG. 1B, another of the various system environments may include the memory system 100b including the memory controller 112b that does not support use of the external pin 132 for recognizing a communication protocol for an operation of the PIM circuit and is not capable of modifying commands. Duplicate description may be omitted.

The memory system 100b according to the embodiment of FIG. 1B may include the memory device 120 that includes the separate external pin 132 but does not use the external pin 132, and the memory controller 112b that does not support use of the external pin 132 to operate the PIM circuit and does not generate a PIM command in the PIM operation mode. According to an embodiment, the external pin 132 is provided as hardware and does not support the memory controller 112b to operate the PIM circuit, and thus, the external pin may be fixed to a low level voltage on the system, for example. As such, in a case of a memory system environment in which the memory controller 112b does not provide a signal through the external pin 132, the memory device 120 may generate a communication protocol for the operation of the PIM circuit by using a predefined series of command/address sequences to operate the PIM circuit.

Referring to FIG. 1C, in another embodiment, one of various system environments may include the memory system 100c including the memory controller 112c that does not support use of an external pin for recognizing a communication protocol for the operation of the PIM circuit and generates and provides a PIM command. Duplicate description may be omitted.

The memory system 100c according to the embodiment of FIG. 1C may include the memory device 120 that includes the separate external pin 132 but does not use the external pin 132, and the memory controller 112c that does not support use of the external pin 132 to operate the PIM circuit and generates a command in a PIM operation mode. In one embodiment corresponding to FIG. 1C, the memory controller 112c may support use of a data bus inversion (DBI) pin or a data mask (DM) pin 138 to recognize a communication protocol for the operation of the PIM circuit. The DBI pin is a signaling pin for selectively inverting a data bus to reduce DC power consumption, and the DB pin may be a signaling pin that prevents writing and reading of some data.

According to the embodiment of FIG. 1C, the memory controller 112c may be modified to generate a PIM command in the PIM operation mode, and thus, when the DBI/DM pin 138 is enabled in the PIM operation mode, the memory controller 112c may be used for the same operation as the external pin 132 for the operation of the PIM circuit. The memory device 120 may operate the PIM circuit by generating a communication protocol for operating the PIM circuit by using a PIM command in a PIM operation mode. According to an embodiment, in order for the DBI/DM pin 138 to operate in various modes as an optional pin, the memory device 120 may use an additional hardware configuration.

Figure 2:
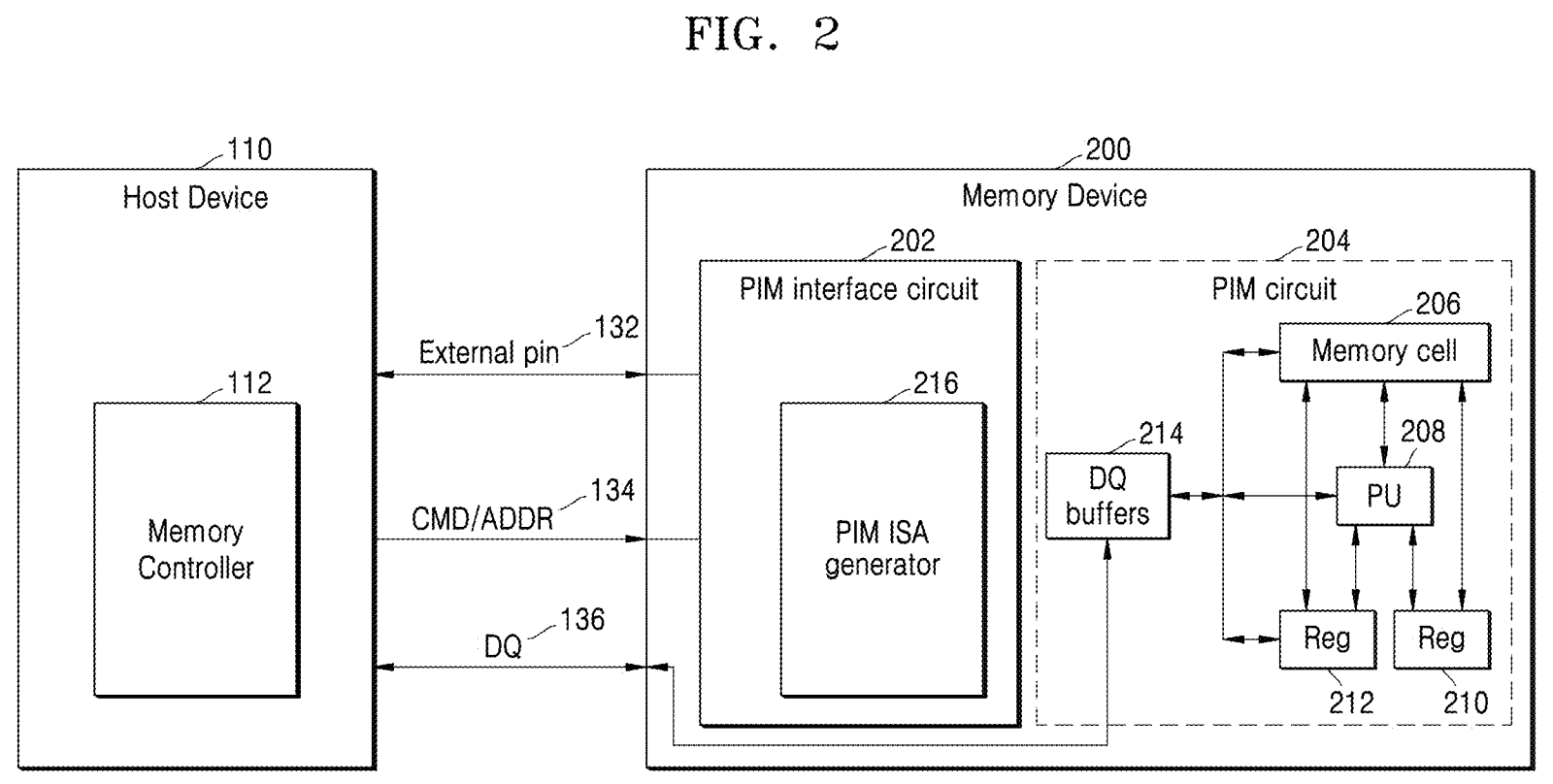

FIG. 2 illustrates a memory device that performs an internal processing operation according to an embodiment of the present disclosure.

Referring to FIG. 2, a memory device 200 may include a PIM circuit 204 that includes a memory cell 206, a processing unit (PU) 208, registers 210 and 212, DQ buffers 214, and a PIM interface circuit 202 that includes a PIM instruction set architecture (ISA) generator 216. Although FIG. 2 illustrates the host device 110 including the external pin 132 as the embodiment of FIG. 1A, the memory device 200 may also be applied to the embodiments of FIGS. 1B and/or 1C. Duplicate description may be omitted.

For example, the memory cell 206 may include a DRAM cell included in the PIM circuit 204. The memory cell 206 may include a plurality of memory cells and may include a cell array including the memory cells, or a plurality of banks. A bank may be defined in various ways, and for example, may be a configuration including memory cells or may also be a configuration including one or more peripheral circuits in memory cells. Although the PIM circuit 204 is illustrated as including the memory cell 206 in the embodiment of FIG. 2, the memory cell 206 may include a cell array included in the memory device 200, and the memory cell 206, the DQ buffers 214, and the like may be provided outside of the PIM circuit 204 without limitation thereto.

The processing unit 208 may be hardware having a processing function similar to or a subset of a processor (for example, a CPU) included in the host device 110. For example, the processing unit 208 may include an arithmetic logic unit (ALU). One or more operands corresponding to a target of processing and/or processing results may be temporarily stored in the registers 210 and 212.

The DQ buffers 214 may be buffers in which data input from the memory controller 112, or output to the memory controller 112 through the data lines DQ 136 of the memory device 200, is stored.

Data stored in the memory cell 206, the processing unit 208, the registers 210 and 212, and the DQ buffers 214 in the PIM circuit 204 may be moved through a data path.

The PIM interface circuit 202 may include the PIM ISA generator 216. The PIM interface circuit 202 may receive a command generated by the memory controller 112 and generate and output a PIM ISA as an internal control signal for controlling the inside of the memory device 200. The ISA may indicate an instruction set structure and may be a set of commands that the processing unit 208 may understand and perform as functions. According to an embodiment of the present disclosure, the PIM interface circuit 202 may operate the PIM circuit 204 by receiving a command and an address applied in a plurality of communication protocol methods depending on various system environments.

According to an embodiment, the PIM ISA generator 216 may be provided as a separate device outside the PIM interface circuit 202. Separately from a communication protocol for an operation of a normal memory in a normal operation mode, the memory device 200 including the processing unit 208 may use a command to operate the processing unit 208, and the PIM ISA generator 216 may convert the command received from the memory controller 112 into an ISA that may be recognized by the PIM circuit.

Figure 3:
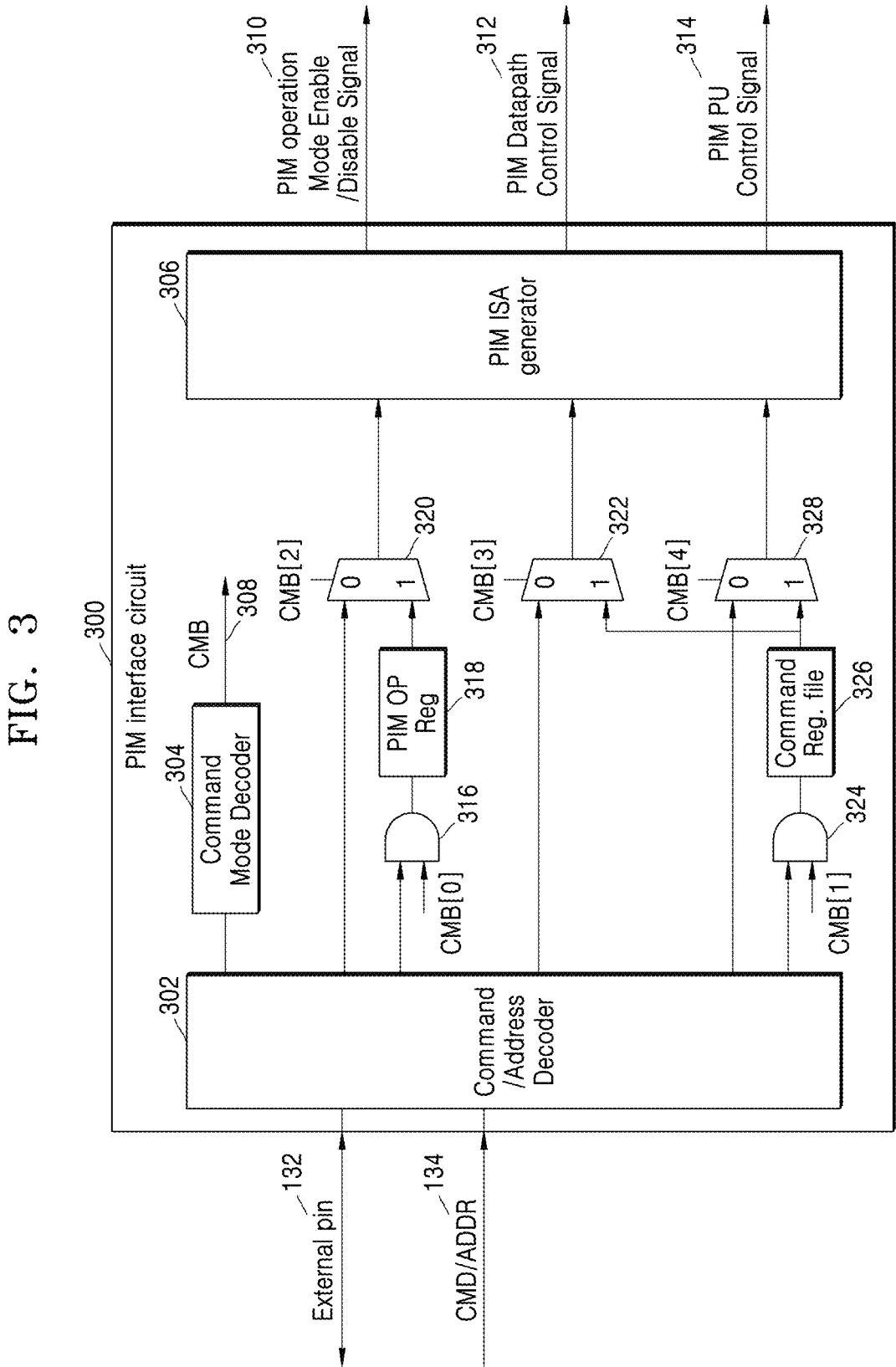
FIG. 3 is a block diagram illustrating an example of a processor in memory (PIM) interface circuit included in the memory device of FIG. 2.

FIG. 3 illustrates an example of a PIM interface circuit that may be included in the memory device of FIG. 2.

Referring to FIG. 3, a PIM interface circuit 300 may include a command/address decoder 302, a command mode decoder 304, and a PIM ISA generator 306. Although FIG. 3 is illustrated by reflecting the embodiment of FIG. 1A in which the external pin 132 is used, the PIM interface circuit 300 may be similarly applied to other embodiments such as the embodiments of FIG. 1B and/or FIG. 1C, without limitation.

The PIM interface circuit 300 may receive a command and an address through the command address signal lines 134. The command/address decoder 302 may generate an internal command by performing a decoding operation on a command and an address from the memory controller.

The command mode decoder 304 may receive an internal command and generate one or more command mode bits CMB. For example, the command mode decoder 304 may generate command mode bits based on an internal command and a signal through the external pin 132 and may generate, for example, five command mode bits CMB[0], CMB[1], CMB[2], CMB[3], and CMB[4]. The command mode decoder 304 may determine a command mode by checking a communication protocol from the generated CMB. In the embodiment of FIG. 3, a signal of the external pin 132 is illustrated as being received by the command mode decoder 304 through the command address decoder 302. According to an alternate embodiment, the signal of the external pin 132 may be directly received by the command mode decoder 304 without passing through the command address decoder 302.

According to the embodiment of FIG. 3, CMB[0] and CMB[1] of the generated CMBs may be respectively input to AND gates 316 and 324. Outputs of the AND gates 316 and 324 may be provided to a PIM operation register 318 and a command register file 326, respectively. CMB[2], CMB[3], and CMB[4] may be the selection signals of a first multiplexer 320, a second multiplexer 322, and a third multiplexer 328, respectively. A command/address (or internal command) output from the command address decoder 302 and a signal output from the PIM operation register 318 may be multiplexed by the first multiplexer 320 in response to CMB[2]. A command/address output from the command address decoder 302 and a signal output from the command register file 326 may be multiplexed by the second multiplexer 322 in response to CMB[3]. In addition, the command/address output from the command address decoder 302 and the signal output from the command register file 326 may be multiplexed by the third multiplexer 328 in response to CMB[4]. Operations of multiplexing CMB[0] to CMB[4] as illustrated in FIG. 3 are non-limiting examples, and the present disclosure may be applied to an interface circuit including a multiplexer implemented in a different way without being limited thereto. An example of a command mode truth table for determining a command mode using the command mode bits may be described in greater detail below with reference to FIG. 5.

For example, internal commands relating to mode enable, data path control, and PU control may be stored based on values of CMB[0] and CMB[1] in the PIM operation register 318 and the command register file 326 in relation to an operation of a PIM circuit and may be provided to the PIM ISA generator 306 through the multiplexers 320, 322, and 328 based on values of CMB[2], CMB[3] and/or CMB[4].

The PIM interface circuit 300 performs the above-described operations of the command/address decoder 302, the command mode decoder 304, and the PIM ISA generator 306, thereby generating signals 310, 312, and 314 for an operation of the PIM circuit that may be recognized by the PIM circuit. The signals 310, 312, and 314 correspond to signals obtained by converting outputs of the multiplexers 320, 322, and 328 into ISAs, which may be recognized by a PIM circuit, by using the PIM ISA generator 306.

For example, a PIM operation mode enable/disable signal 310 may be a signal for controlling enabling or disabling of a PIM operation mode. A PIM data path control signal 312 may be a signal controlling a data path between the memory cell 206 (FIG. 2), the processing unit 208 (FIG. 2), the registers 210 and 212 (FIG. 2), and the DQ buffers 214 (FIG. 2) of the PIM circuit 204. In addition, the PIM PU Control Signal 314 may be a signal for controlling an arithmetic operation and/or a logical operation of the processing unit 208 (FIG. 2).

Figure 4:
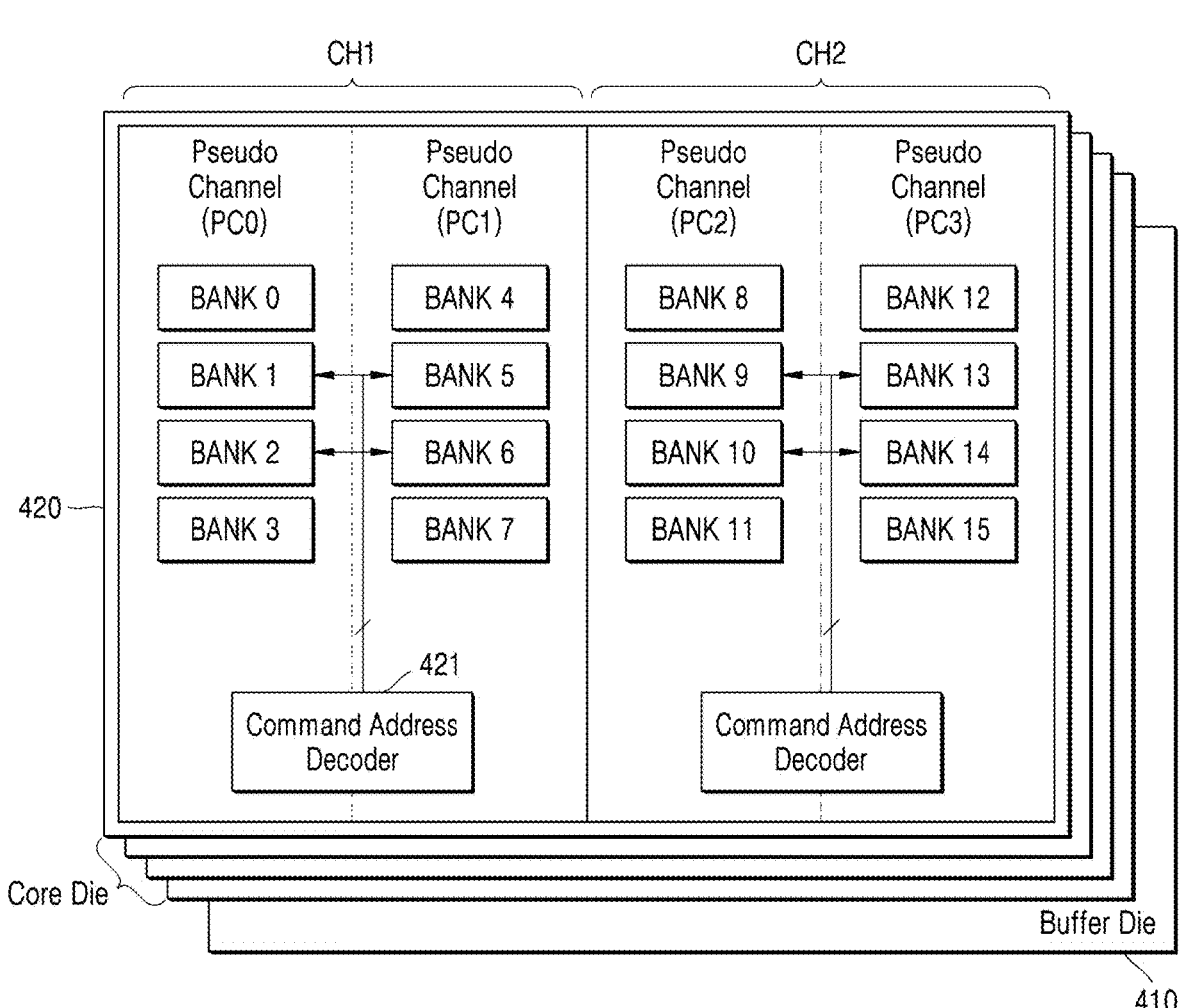
FIG. 4 is a block diagram illustrating a memory device that includes a high-bandwidth memory (HBM) according to an embodiment of the present disclosure.

FIG. 4 illustrates an example in which a memory device according to an embodiment of the present disclosure includes an HBM.

According to an embodiment of the present disclosure, memory devices such as 120 and 200 may include HBM devices. An HBM 400 may include a plurality of channels, each having an interface circuit independent of each other. Such an HBM may have a high bandwidth capability. Referring to FIG. 4, the HBM 400 may include a plurality of dies, and may include, for example, a buffer die 410 or a logic die, and one or more core dies stacked thereon. Although FIG. 4 illustrates an example in which four core dies are included in the HBM 400, the number of core dies may be variously changed. A configuration of FIG. 4 may be described with reference to a first core die 420 among the core dies, without limitation thereto.

FIG. 4 illustrates an example in which the first core die 420 includes a first channel CH1 and a second channel CH2, as one or more channels per core die. The buffer die 410 may include an interface circuit that communicates with a memory controller (or host), and commands/addresses and data may be received through the buffer die 410 from the memory controller. In addition, according to an embodiment, each of the first channel CH1 and the second channel CH2 may include a command address decoder 421.

In addition, FIG. 4 illustrates an implementation example in which each channel of the HBM 400 includes at least two pseudo channels PCs. For example, the first channel CH1 may include a first pseudo channel PC0 and a second pseudo channel PC1, and data lines corresponding to the first pseudo channel PC0 and the second pseudo channel PC1 are implemented separately from each other, and the first pseudo channel PC0 and the second pseudo channel PC1 may share the command address decoder 421. According to an embodiment, separate command address decoders respectively corresponding to the first pseudo channel PC0 and the second pseudo channel and PC1 may be provided. In addition, according to various embodiments, some of other various components relating to mode setting may be implemented to be shared by the first pseudo channel PC0 and the second pseudo channel PC1, and the others may also be implemented separately for each pseudo channel. That is, the first pseudo channel PC0 and the second pseudo channel PC1 may communicate with a memory controller through separate data lines and may communicate with the memory controller through common command/address lines.

According to an embodiment of the present disclosure, each of the first pseudo channel PC0 and the second pseudo channel PC1 may include a plurality of bank regions, and, for example, the first pseudo channel PC0 may include a 0$^{th}$ bank BANK0 to a third bank BANK3, and the second pseudo channel PC1 may include a fourth bank BANK4 and a seventh bank BANK7.

According to an operation example, a command mode of the plurality of banks may be variably set in one channel. For example, the 0$^{th}$ bank BANK0 to the third bank BANK 3 in the first channel CH1 may be set to a command mode 1, and an eighth bank BANK8 to an 11$^{th}$ bank BANK11 in the second channel CH2 may be set to command mode 2. Examples of the command mode 1 and the command mode 2 may be described below in greater detail with reference to FIG. 5.

In addition, in embodiments of the present disclosure, various types of PIM operation modes may be defined in relation to a PIM operation, and different types of PIM operation modes may be applied to each channel. In addition, the PIM interface circuits described in the above embodiments may be respectively arranged for each channel, and accordingly, the command mode decoder and the PIM ISA generators may also be provided in each channel of the HBM 400 of FIG. 4.

According to the above-described embodiment of the present disclosure, a plurality of processing units for internal processing may be arranged to correspond to the banks of the core dies and may provide commands in units of a bank area, and thus, many arithmetic operations in the memory device may be processed quickly and also the arithmetic operations may be optimized according to various types of applications being executed.

FIG. 5 illustrates an example of a command mode truth table for an operation of the command mode decoder of FIG. 3.

Referring to FIG. 5, an example of a command mode truth table 500 including truth values of a plurality of command mode bits (CMBs) generated by the command mode decoder 304 (FIG. 3) is illustrated.

The command mode truth table 500 is predefined by the command mode decoder 304 (FIG. 3) and may be a truth table for setting a command mode according to command mode bit values. For example, the command mode truth table 500 may include truth values for a command mode 1, reference numeral 502, and a command mode 2 504. The present disclosure may be applied to a truth table for other command modes including other truth values.

The command mode 1, reference numeral 502, may be a command mode corresponding to the embodiment of FIG. 1A in which a PIM circuit operates by using the separate external pin 132 (FIG. 1). Referring to FIG. 5, the external pin 132 (FIG. 1) may include a reserved for future use (RFU) pin. The RFU pin may have a value defined in an HBM standard, and in a current HBM standard, the RFU pin is not limited to a specified function and may correspond to an unused pin when a separate function is not applied thereto.

Referring to FIG. 5, an RFU 506 indicates an item representing whether a voltage level of a signal applied to the RFU pin is a high level or a low level. For example, when the signal of the RFU pin is applied as a high level, the command mode decoder 304 (FIG. 3) may identify a command mode 1, reference numeral 502, through logical values 510 of the command mode bits regardless of a predefined row command/address sequence 508. The predefined row command/address sequence 508 may be further described below with reference to FIG. 8.

According to this embodiment, the command mode decoder 304 (FIG. 3) may receive a signal and an internal command applied to the RFU pin, and, based on the signal and command, may generate CMB[0] of a low value, CMB[1] of a low value, CMB[2] of a low value, CMB[3] of a low value, and CMB[4] of a high value, and may identify that a command mode is the command mode 1, reference numeral 502, from the generated CMB.

The command mode 2, reference numeral 504, may be a command mode corresponding to the embodiment of FIG. 1B in which the PIM circuit operates without using the separate external pin 132 (FIG. 1). For example, when the RFU 506 has a low value, the command mode decoder 304 (FIG. 3) may determine whether a command/address from a memory controller corresponds to the predefined row command/address sequence 508. As a result of the determination, when the command/address from the memory controller corresponds to the predefined row command/address sequence 508, a plurality of (for example five) command mode bits may be generated, and CMB[0], CMB[1], CMB [2], CMB[3], and CMB[4] may be set to high values. The command mode decoder 304 (FIG. 3) may identify the command mode 2, reference numeral 504, through logical values 510 of the generated command mode bits.

According to an embodiment of the present disclosure, the command mode decoder 304 (FIG. 3) may set a command mode based on the predefined command mode truth table 500.

FIGS. 6A, 6B, 7A, and 7B illustrate command truth tables of commands received from a respective memory controller to a respective memory device.

For example, FIGS. 6A and 6B illustrate row command truth tables, and FIGS. 7A and 7B illustrate column command truth tables.

FIGS. 6A and 7A respectively illustrate an unmodified row command truth table and an unmodified column command truth table in a normal operation mode. A memory controller and an interface circuit share the command truth tables, the memory controller may generate a command for operating a memory device in a normal operation mode, and a command address decoder included in the interface circuit may identify the command truth tables.

Referring to FIG. 6A, respective columns of a row command truth table 600a may include a row command, a symbol of the row command, a clock cycle, and row 0 to row 9 (R0 to R9). The row 0 to row 9 may include information on values of a row address RA, a bank address BA, a pseudo channel PC, a stack ID SID, a valid signal V, a high level H, and a low level L.

A row no operation command RNOP may be a command for preventing unwanted row commands from being registered during an idle state or a wait state. The Register data may be loaded through inputs R0 through R9.

An activate (1 Bank) command ACT may be a command for activating (that is, opening) a row of a certain bank. R0 to R9 may include values of bank addresses BA or values of row addresses RA and may select a bank and a row to be activated.

A precharge command PREpb and a precharge the command PREab may be commands for respectively deactivating an open row of a certain bank or deactivating open rows of the banks. In addition, a per-bank refresh command REFpb and an all-bank refresh command REFab may be commands for periodically recharging a certain bank or the banks to compensate for discharge of capacitor charges of memory cells. For the sake of convenient description, descriptions of other row commands are omitted.

Referring to FIG. 7A, respective columns of a column command truth table 700a may include a column command, a symbol of the column command, a clock cycle, and a column 0 to a column 9 (C0 to C9). The column 0 to column 7 may include information on values of an operation code OP of a mode register, a column address CA, a bank address BA, a mode address MA, a pseudo channel PC, a stack ID SID, a valid signal V, a high level H, and a low level L.

A column no operation command CNOP may be a command for preventing unwanted column commands from being registered during an idle state or a wait state. The register data may be loaded through inputs C0 through C7.

A read command RD and a read with auto-precharge RDA command may be commands for reading data from an activated row. A write command WR and a write with auto-precharge WRA command may be used to write data to an activated row.

A mode register set command MRS may be a command for programming the mode registers and maintaining stored information. The mode registers may each be a device for storing data to control various operation modes of a memory device and may set an operation mode of the memory device. In addition, a mode register read command MRR may be used to output mode information stored in a register.

FIGS. 6B and 7B respectively illustrate a row command truth table and a column command truth table modified to include the PIM command for operating the PIM circuit according to the embodiment of FIG. 1A.

According to FIG. 1A, a memory controller may be modified to include the row command truth table and the column command truth table including commands for operating the PIM circuit. In FIGS. 6B and 7B, it may be assumed for case of explanation that a memory system includes a memory controller capable of supporting use of an external pin for an operation of the PIM circuit, according to the embodiment of FIG. 1A, without limitation thereto.

The memory controller and an interface circuit may share a modified command truth table, the memory controller may generate a PIM command capable of operating the PIM circuit, and a command address decoder included in the interface circuit may identify the modified command truth table.

Referring to FIG. 6B, fields of RFU commands relating to an activate command and a precharge command may be added to the modified row command truth table. According to an embodiment, by adding the RFU command not used in the memory device in a normal operation mode to the command truth table for a PIM operation mode, the PIM circuit may be operated by using added RFU commands 602b and 604b. An RFU pin included in the memory device may be operated as a mode master pin.

The memory device may include memory cells configuring a plurality of banks and a PIM circuit and may be configured to output data by simultaneously operating the plurality of banks in relation to an operation of the PIM circuit. Accordingly, commands regarding how many rows of the plurality of banks are to be activated or how many rows of the plurality of banks are to be precharged may be considered. The number of banks used among the plurality of banks may affect power consumption of the memory device.

For example, referring to the RFU command 602b of FIG. 6B, the RFU command added to a row command truth table 600b may include an activate a quarter of the banks for PIM operation mode entry command, an activate a half of the banks for PIM operation mode entry command, and an activate the banks for PIM operation mode entry command.

The activate a quarter of the banks for PIM operation mode entry command ACTQP may be a command for activating (that is, opening) rows of bank(s) corresponding to a quarter of the banks to enter the PIM operation mode. The activate a half of the banks for PIM operation mode entry command ACTHP may be a command for activating (that is, opening) rows of bank(s) corresponding to half of the banks to enter the PIM operation mode. In addition, the activate the banks for PIM operation mode entry command ACTAP may be a command for activating (that is, opening) rows of banks corresponding to the banks to enter the PIM operation mode. According to this embodiment, an example is used in which commands for activating the banks are divided into half, quarter, and substantially all of the banks, but the technical idea of the present disclosure may be applied to a method of selecting and activating another part of the banks.

For example, referring to the RFU command 604b of FIG. 6B, the RFU commands added to the row command truth table 600b may include a precharge a quarter of the banks for PIM operation mode exit command, a precharge a half of the banks for PIM operation mode exit command, and a precharge the banks for PIM operation mode exit command.

The precharge a quarter of the banks for PIM operation mode exit command PREqbP may be a command for precharging rows of bank(s) corresponding to a quarter of the banks to exit the PIM operation mode. The precharge a half of the banks for PIM operation mode exit command PREhbP may be a command for precharging rows of bank(s) corresponding to half of the banks to exit the PIM operation mode. In addition, the precharge the banks for PIM operation mode exit command PREabP may be a command for precharging rows of banks corresponding to the banks to exit the PIM operation mode. According to this embodiment, an example is used in which commands for precharging the banks are divided into half, quarter, and substantially all of the banks, but the technical idea of the present disclosure may be applied to a method of selecting and precharging other portions of the banks. For brevity of description, substantially duplicate description as given with reference to FIG. 6A may be omitted.

Referring to FIG. 7B, fields of the RFU command relating to a Read command and a Write command may be added to the modified column command truth table, and a signal 702b of the RFU pin may be added as an input. According to this embodiment, by adding RFU commands 604b, 606b, and 608b not used in the memory device in the normal operation mode and the signal 602b of the RFU pin as inputs, the PIM circuit may be operated by using the signal of the RFU pin and the added command. The RFU pin included in the memory device may be operated as a mode master pin.

For example, referring to 704b and 706b of FIG. 7B, RFU commands added to the column command truth table 700b may include a ReadP command 704b and a WriteP command 706b.

The ReadP command 704b and the WriteP command 706b correspond to commands in the PIM operation mode.

For example, in order for a processing unit of the PIM circuit to operate, two operands corresponding to targets of processing may be required. The operands may be internal data read from the memory cells and registers included in the memory device or may be external data read from the DQ buffers. The data from the DQ buffers may indicate data provided from the memory controller through the data lines DQ. For example, the processing unit may also receive first data in the register and second data in the memory cell as operands to perform an arithmetic operation on the data and may also receive third data in the DQ buffers and fourth data in the DQ buffers as operands to perform an arithmetic operation on the data.

In a case of the memory device according to this embodiment of the present disclosure, a data path operation of the PIM circuit may change depending on which device receives data to write the data to the memory device or which device receives the data read from memory cells. When data is transmitted between a memory device and a memory controller, signals for controlling read or write of data have to be synchronized with the memory controller, and in this case, setting of a read latency (RL) or setting of a write latency (WL) may be satisfied. The RL and the WL follow a specification of a joint electron device engineering council (JEDEC) document, which provides a standard for memory operating modes. When a processing unit of the memory device performs internal processing and transmits data from the memory device to the memory controller, the ReadP command 704*b* may be a command for transmitting data while satisfying RL setting.

For example, the data transmitted from the memory device to the memory controller may be internal processing result data, or data stored in memory cells or registers of the memory device, but the present disclosure is not limited thereto. The WriteP command 706*b* may be a command for transmitting data while satisfying a WL setting when transmitting data from the memory controller to the memory device, and for causing the processing unit of the memory device to perform internal processing by using the transmitted data. For example, the internal processing result data or the data transmitted from the memory controller may be written to memory cells or registers of the memory device, and the present disclosure is not limited thereto.

Referring to FIG. 7B, the read command for the normal operation mode and the ReadP command for the PIM operation mode have the same values corresponding to the column 0 to the column 7, and a value of column 8 corresponding to a signal on the RFU pin is high, a column command thereon corresponds to the ReadP command, and when the value of column 8 is low, the column command thereon corresponds to the read command. Values corresponding to the column 0 to the column 8 of the Read command and the ReadP command may be referred to as having a first pattern, and when the value of column 8 is high, the value may be a first value, and when the value of column 8 is low, the value may be a second value.

When values corresponding to column 0 to column 7 of the WriteP command for the normal operation mode and the Write command for the PIM operation mode are the same and the value of column 8 corresponding to the signal of the RFU pin is high, the command corresponds to the WriteP command, and when the value of column 8 is low, the command corresponds to the Write command. Values corresponding to the column 0 to the column 8 of the write command for the normal operation mode and the WriteP command for the PIM operation mode may be referred to as having a second pattern, and when the value of column 8 is high, the value may be a first value, and when the value of column 8 is low, the value may be a second value.

For example, referring to 708*b* of FIG. 7B, RFU commands added to the column command truth table 700*b* may include a PIMRead command PIMR and a PIMWrite command PIMW.

The PIMRead command may be a command for reading data from memory cells or registers of the memory device to perform internal processing in the processing unit. The PIMWrite command may be a command for performing the internal processing in the processing unit of the memory device and write processing result data or processing unit internal data to the memory cells or registers. The PIMRead command and the PIMWrite command do not involve data exchange with the memory controller, and thus, the PIMRead command and the PIMWrite command need not satisfy the RL setting and the WL setting, respectively. For example, when accessing memory cells of the memory device according to the PIMRead command and the PIMWrite command, setting of a CCDL cycle or a CCDS cycle, which is an operation frequency for operating the PIM circuit, needs to be satisfied when data is read and written. For example, when a bank that may be referred to as bank A and a bank that may be referred to as bank B are included in the same bank group, the CCDL cycle may be a time taken from an access to the Read/Write bank A to an access to the Read/Write bank B.

For example, when the bank A and the bank B are included in different bank groups, the CCDS cycle may be a time taken from the access to the Read/Write bank A to the access to the Read/Write bank B. The CCDL cycle setting and the CCDS cycle setting follow the specifications of the JEDEC document. The bank group may be defined in various ways and may be defined as, for example, a configuration including a plurality of banks.

Figure 8:
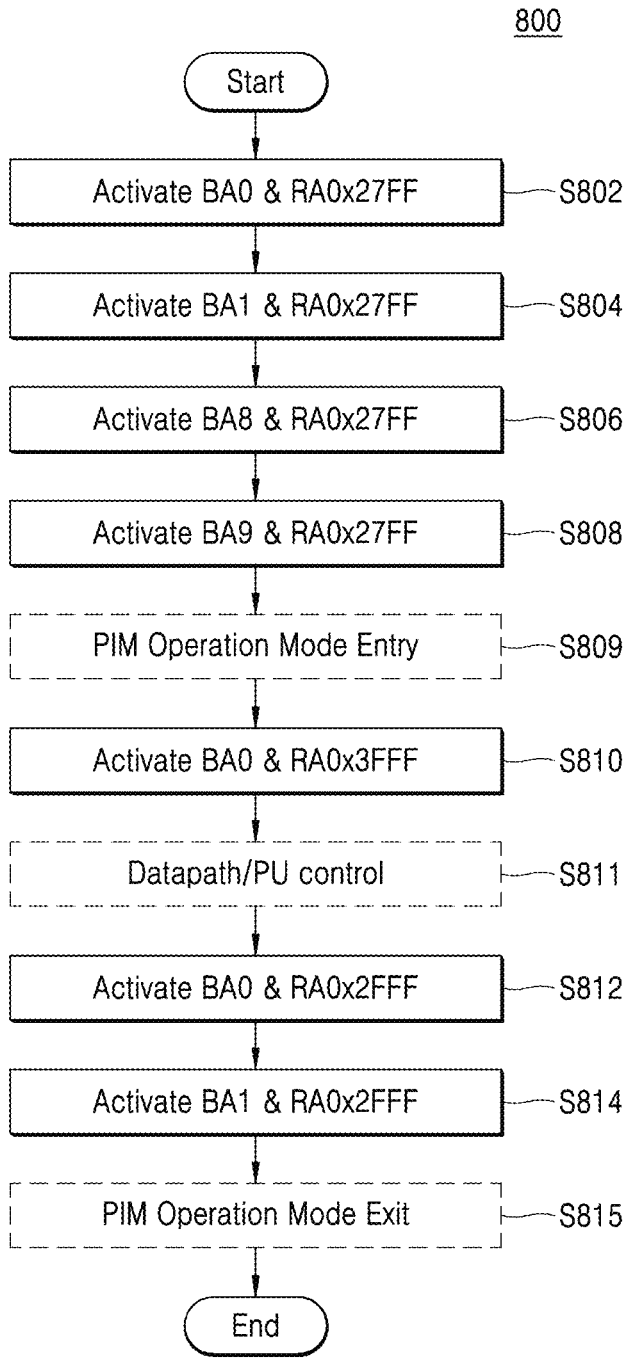
FIG. 8 is a flowchart diagram illustrating an operation of a PIM circuit using a predefined command/address sequence, according to the embodiment of FIG. 1B.
Figure 9:
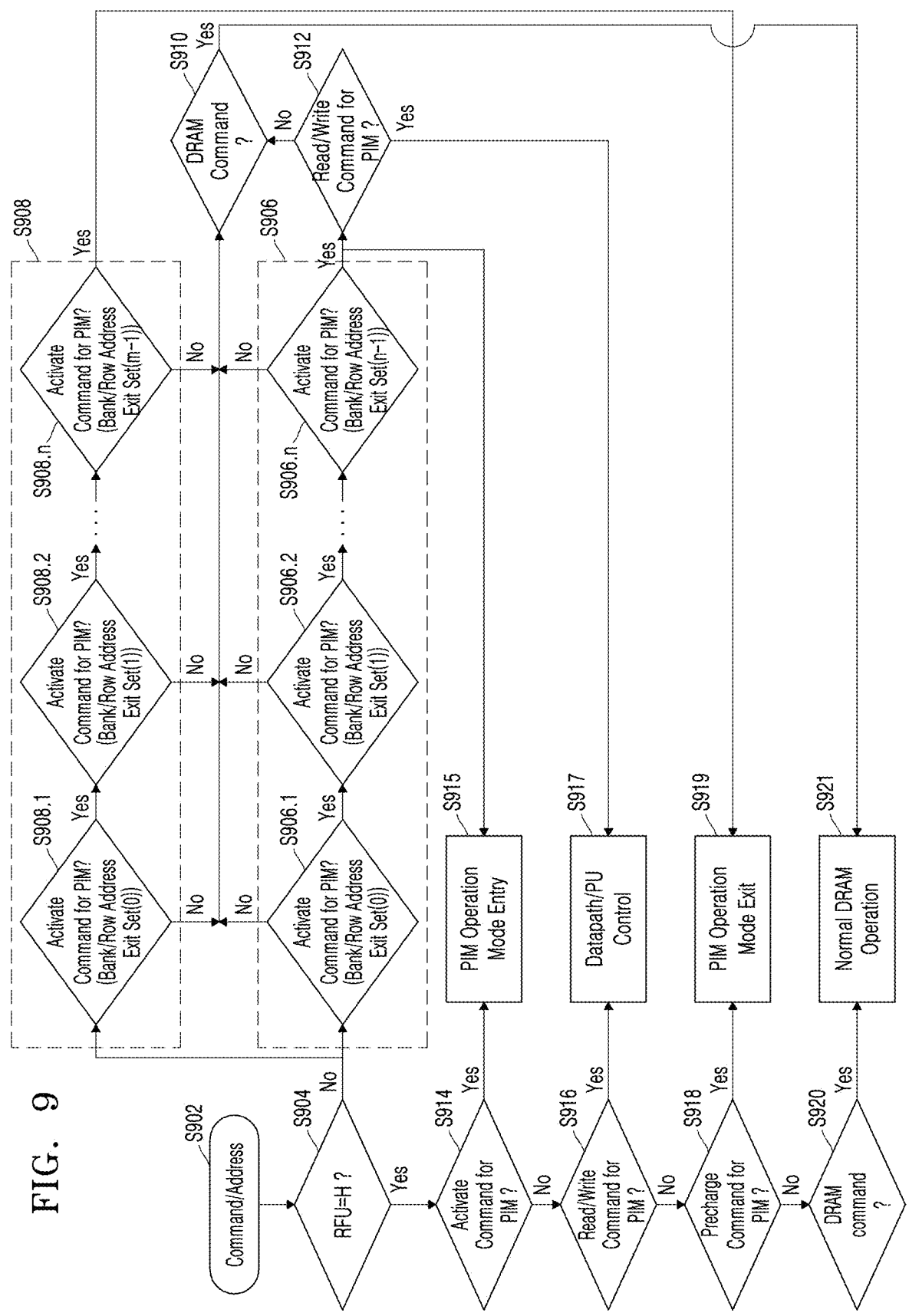
FIG. 9 is a flowchart diagram illustrating a method of operating a memory device according to an embodiment of the present disclosure.

FIGS. 8 and 9 are diagrams illustrating an operation of a PIM circuit using a predefined row command/address sequence according to the embodiment of FIG. 1B.

Referring to FIGS. 1B, 8, and 9, the memory system environment according to the embodiment of FIG. 1B represents an example in which the command mode decoder 304 (FIG. 3) operates a PIM circuit by using a predefined row command/address sequence 800 and a row command/address sequence from the memory controller 112 (FIG. 1B). In an embodiment, in a system environment in which the RFU pin 132 (FIG. 1B) is not used and the memory controller 112 (FIG. 1B) is not modified, the memory controller 112 (FIG. 1B) may operate the PIM circuit when inputting a row command/address sequence corresponding to the row command/address sequence 800 predefined by the command mode decoder 304 (FIG. 3) to the memory device 120 (FIG. 1B).

In FIG. 8, it may be assumed for ease of explanation that this is a case in which the memory controller 112 (FIG. 1B) transmits the row command/address sequence corresponding to the predefined row command/address sequence 800 to the memory device 120 (FIG. 1B), without limitation thereto.

The predefined row command/address sequence 800 may include bank/row address entry sets set(0), set(1), set(2), . . . , and set(n−1) for an activate command. The bank/row address entry sets set(0), set(1), set(2), . . . , and set(n−1)) may include a bank address (BA) bit (for example, BA0) and row address (RA) bit values (for example, RA0x27FF).

For example, the command mode decoder 304 (FIG. 3) may preset set(0) to set(3) corresponding to the bank address/row address sets. For example, set(0) may be predefined as BA0 & RA0x27FF, set(1) may be predefined as BA1 & RA0x27FF, set(2) may be predefined as BA8 & RA0x27FF, and set(3) may be predefined as BA9 & RA0x27FF. For example, BA0 & RA0x27FF corresponding to set(0) may be represented as an address made of a hexadecimal code and may indicate that a bank address is 0 and a row address is 0x27FF. A word-line identified by bank address bits and row address bits included in each bank/row address entry set, that is, set(0) to set(3), may be activated by the activate command.

In step S802, when a memory device receives an activate command together with address information included in set(0), a word-line corresponding to a bank address 0 and a row address 0x27FF corresponding to set(0) may be activated. In step S804, when the memory device receives the activate command together with address information included in set(1), a word-line corresponding to a bank address 1 and the row address 0x27FF may be activated. In step S806, when the memory device receives the activate command together with address information included in set(2), a word-line corresponding to a bank address 8 and the row address 0x27FF may be activated. In step S808, when the memory device receives the activate command together with address information included in set(3), a word-line corresponding to a bank address 9 and the row address 0x27FF may be activated.

For example, when the word-lines corresponding to set(0) to set(3) are activated in step S802 to step S808, a status of the memory device may be entering at step S809 a PIM operation mode (PIM Operation Mode Entry). According to an embodiment, set(0) to set(3) may be bank/row address entry sets for entering the PIM operation mode.

For example, the command mode decoder 304 (FIG. 3) may pre-define set(4) corresponding to the bank address/row address set. For example, BA0 & RA0x3FFF corresponding to set(4) may be represented as an address made of a hexadecimal code and indicates that a bank address is 0 and a row address is 0x3FFF. A word-line identified by a bank address bit and row address bits included in the bank/row address entry set included in set(4) may be activated by the activate command.

In step S810, when the memory device receives the activate command together with address information corresponding to set(4), a word-line corresponding to the bank address 0 and the row address 0x3FFF corresponding to set(4) may be activated.

For example, when the word-line corresponding to set(4) is activated in step S810, a status of the memory device may be entering at step S811 a data path and processing unit control (Datapath/PU control) mode in which data moves in the PIM circuit.

The predefined row command/address sequence 800 may include bank/row address exit sets set(0), set(1), set(2), . . . , and set(m−1) for the activate command. For example, the command mode decoder 304 (FIG. 3) may predefined set(5) and set(6) corresponding to bank address/row address sets. For example, set(5) may be predefined as BA0 & RA0x2FFF, and set(6) may be predefined as BA1 & RA0x2FFF. For example, BA0 & RA0x2FFF corresponding to set(5) may be represented as an address made of a hexadecimal code and may indicate that the bank address is 0 and the row address is 0x2FFF. A word-line identified by a bank address bit and row address bits included in each bank/row address exit set, that is, set(5) and set(6), may be activated by the activate command.

In step S812, when the memory device receives the activate command together with address information included in set(5), a word-line corresponding to a bank address 0 and a row address 0x2FFF corresponding to set(5) may be activated. In step S814, when the memory device receives the activate command together with address information corresponding to set(6), a word-line corresponding to a bank address 1 and the row address 0x2FFF may be activated.

When both the word-lines corresponding to set(5) and set(6) are activated in step S812 to step S814, a status of the memory device at step S815 may be ending a PIM operation mode (PIM Operation Mode Exit). According to an embodiment, set(5) and set(6) may be bank/row address exit sets for ending the PIM operation mode.

FIG. 9 is a flowchart illustrating an operation of a memory device according to an embodiment of the present disclosure.

Referring to FIGS. 5 to 8, an example is illustrated in which the memory device according to an embodiment of the present disclosure operates an OIM circuit by using the command mode truth table 500 (FIG. 5), the row command truth tables 600a and 600b (FIGS. 6A and 6B), the column command truth tables 700a and 700b (FIGS. 7A and 7B), or the predefined row command/address sequence 800 (FIG. 8) after receiving a command/address from a memory controller.

Reference may now be made to FIG. 9. In step S902, the memory device may receive a command/address from the memory controller. The command/address may include a plurality of commands and/or addresses and may be a row command/address sequence.

In step S904, the command mode decoder may determine whether or not a level of a voltage applied to the RFU pin is a high level H according to the predefined command mode truth table 500 (FIG. 5).

When it is determined that the level of the voltage applied to the RFU pin is the high level H, the command mode decoder may identify the command mode 1, reference numeral 502, (FIG. 5) for operating the PIM circuit by using the RFU pin.

In step S914, the memory device may determine whether or not the received command is an activate command in a PIM operation mode according to the modified row command truth table 600b (FIG. 6B). When it is determined that the received command is the activate command in the PIM operation mode, a status of the memory device at step S915 may be entering the PIM operation mode (PIM Operation Mode Entry).

In step S916, the memory device may determine whether or not the received command is one of a ReadP command, a WriteP command, a PIMRead command, and a PIMWrite command, according to the modified column command truth table 700b (FIG. 7B). When it is determined that the received command is one of the ReadP command, the WriteP command, the PIMRead command, and the PIM-Write command, the status of the memory device at step S917 is determined as entering a mode for controlling a data path and a processing unit (Datapath/PU control) in the PIM circuit. For example, when it is determined that the received command is the ReadP command or the WriteP command, the data path and the processing unit may be controlled to perform an arithmetic operation on data provided from the memory controller and data read from memory cells in the PIM circuit such that the RL or the WL is satisfied. In another example, when it is determined that the received command is the PIMRead command or the PIMWrite command, the data path and the processing unit may be controlled to satisfy the CCDL cycle required to read or write data by accessing banks included in the same bank group.

In step S918, the memory device may determine whether or not the received command is a precharge command in the PIM operation mode according to the modified row command truth table 600b (FIG. 6B). When it is determined that the received command is the precharge command in the PIM operation mode, a status of the memory device at step S919 may be ending the PIM operation mode (PIM Operation Mode Exit). In step S920, the memory device may determine whether or not the received command is a DRAM command. When it is determined that the received command is the DRAM command, a status of the memory device at step S921 may be a DRAM operating mode (Normal DRAM Operation).

When it is determined that a signal of the RFU pin is not at a high level, the command mode decoder may identify the command mode 2, reference numeral 504, (FIG. 4) for operating the PIM circuit without using a separate external pin. As described above with reference to FIG. 8, the PIM circuit may be operated by using a predefined row commands/address sequence.

In step S904, when it is determined that the level of the voltage applied to the RFU pin is not the high level H, the command mode decoder may identify the command mode 2, reference numeral 504, (FIG. 5) for operating the PIM circuit without using the RFU pin.

In steps S906 and S908, the memory device may sequentially determine whether or not the received command corresponds to a bank/row address entry set for the activate command, according to the predefined row command/address sequence 800. For example, step S802 to step S810 of FIG. 8 may correspond thereto, and n=5. When the sequentially received commands correspond to the bank/row address entry sets for the activate command, a status of the memory device may be entering the PIM operation mode (PIM Operation Mode Entry). For example, a first decision block S906.1 may determine an activate command for exit set(0), a second decision block S906.2 may determine an activate command for exit set(1), up to an n-th decision block S906.n may determine an activate command for exit set(n−1). Similarly, a first decision block S908.1 may determine an activate command for exit set(0), a second decision block S908.2 may determine an activate command for exit set(1), up to an n-th decision block S908.n may determine an activate command for exit set(n−1).

In step S912, it may be determined whether a read command or a write command received together with the sequentially received activate command is a read command or a write command in the PIM operation mode. When the received command is the read command or the write command in the PIM operation mode, the memory device may be entering a mode for controlling a data path and a processing unit (Datapath/PU control) in the PIM circuit.

In step S908, the memory device may sequentially determine whether or not the received command corresponds to the bank/row address exit set for the activate command according to the predefined row command/address sequence 800.

For example, step S812 to step S814 of FIG. 8 may correspond thereto, and m=2. When the sequentially received commands correspond to the bank/row address exit sets for the activate command, a status of the memory device may be ending the PIM operation mode (PIM Operation Mode Exit).

When it is determined that the commands received in step S906 and step S908 do not correspond to the bank/row address entry/exit sets for the activate command, whether or not the received commands are the commands in the normal operation mode may be determined in step S910. As the determination result, when the received command is a command in a normal operation mode, the PIM circuit may operate in the normal operation mode.

Figure 10:
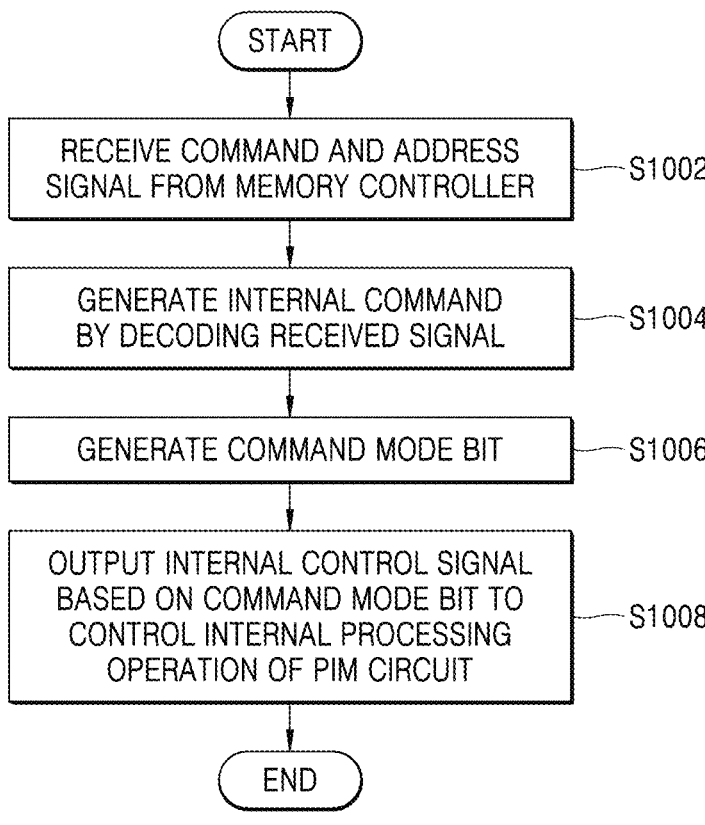
FIG. 10 is a flowchart diagram illustrating a method of operating a memory system according to an embodiment of the present disclosure.

FIG. 10 is a flowchart illustrating a method of operating a memory device in a memory system according to an embodiment of the present disclosure.

Referring to FIG. 10, in step S1002, a memory controller may provide one or more command/address signals to the memory device for a memory operation and internal processing of the memory device, and the memory device may receive the command/address signal from the memory controller. In step S1004, the memory device may generate an internal command by decoding the command/address signal received from the memory controller. In step S1006, the memory device may generate a command mode bit by using the internal command. According to this embodiment, the command mode bit may be determined according to whether a signal of an external pin included in the memory device is applied as a high level or a low level. In step S1008, the memory device may identify the command mode by a combination of the generated command mode bits and may output an internal control signal based on the generated command mode bits to control an internal processing operation of the PIM circuit.

While the present disclosure has been particularly shown and described with reference to embodiments thereof, it shall be understood that various changes in form and details may be made therein by those of ordinary skill in the pertinent art without departing from the spirit and scope of the following claims.

What is claimed is:

1. A memory device comprising:
a processor in memory (PIM) circuit including an internal processor configured to perform an internal processing operation; and
an interface circuit connected to the PIM circuit,
wherein the interface circuit comprises:
a command address decoder configured to decode a command and an address received through first pins to generate an internal command;
a second pin configured to receive a voltage signal relating to control of a PIM operation mode; and
a command mode decoder configured to generate at least one command mode bit (CMB) based on the internal command and the voltage signal,
wherein the interface circuit is configured to control the internal processing operation of the PIM circuit by outputting internal control signals to the PIM circuit based on the at least one CMB,
wherein the second pin comprises an external pin activated in response to an external memory controller being configured to support use of the external pin for a PIM operation, and deactivated in response to the external memory controller not being configured to support the use of the external pin for the PIM operation.

2. The memory device of claim 1,
wherein the command mode decoder is configured to use the voltage signal in accordance with a truth table,
wherein the interface circuit further comprises a PIM instruction set architecture (ISA) generator configured to generate a PIM ISA as the internal control signals in response to the at least one CMB.

3. The memory device of claim 1, wherein the internal control signals include a PIM operation mode enable/disable control signal for enabling/disabling the PIM operation mode, a PIM data path control signal for controlling a data path in the PIM circuit, and a PIM processing unit (PU) control signal for controlling a processing operation of the internal processor.

4. The memory device of claim 1, wherein the second pin includes a reserved for future use (RFU) pin defined in a high-bandwidth memory (HBM) specification.

5. The memory device of claim 1, wherein:
the memory device includes a plurality of banks, and the interface circuit generates the internal control signals such that some of the plurality of banks enter the PIM operation mode according to a combination of the command, the address, and the voltage signal.

6. The memory device of claim 5, wherein some of the plurality of banks correspond to one of a quarter of the plurality of banks and a half of the plurality of banks.

7. The memory device of claim 1, wherein:

the memory device includes a plurality of banks, and the interface circuit generates the internal control signals such that all of the plurality of banks enter the PIM operation mode according to a combination of the command, the address, and the voltage signal.

8. The memory device of claim 1, wherein:

the memory device includes a plurality of banks, and the interface circuit generates the internal control signals such that some of the plurality of banks end the PIM operation mode according to a combination of the command, the address, and the voltage signal.

9. The memory device of claim 8, wherein some of the plurality of banks correspond to one quarter of the plurality of banks and a half of the plurality of banks.

10. The memory device of claim 1, wherein:

the memory device includes a plurality of banks, and the interface circuit generates the internal control signals such that all of the plurality of banks end the PIM operation mode according to a combination of the command, the address, and the voltage signal.

11. A memory device comprising:

a processor in memory (PIM) circuit including an internal processor configured to perform an internal processing operation; and an interface circuit, connected to the PIM circuit, configured to decode a command and an address received through first pins, and configured to generate at least one internal control signal for controlling the PIM circuit based on the command and the address and a voltage signal received through a second pin, wherein, in a case where the command and the address have a first pattern, the memory device enters a PIM operation mode when the voltage signal has a first value, and the memory device enters a normal operation mode when the voltage signal has a second value, wherein the second pin comprises an external pin activated in response to an external host device being configured to support use of the external pin for a PIM operation, and deactivated in response to the external host device not being configured to support the use of the external pin for the PIM operation.

12. The memory device of claim 11, wherein the interface circuit comprises a command mode decoder configured to use the voltage signal in accordance with a truth table, wherein the second pin includes a reserved for future use (RFU) pin defined in a high-bandwidth memory (HBM) specification.

13. The memory device of claim 11, wherein the at least one internal control signal comprises a plurality of internal control signals, wherein the interface circuit comprises:

a command address decoder configured to decode the command and the address to generate an internal command;

a command mode decoder configured to generate at least one command mode bit (CMB) based on the internal command and the voltage signal; and a PIM instruction set architecture (ISA) generator configured to generate a PIM ISA as the internal control signals in response to the at least one CMB.

14. The memory device of claim 13, the interface circuit comprises a plurality of multiplexers configured to select and output one of the internal command and data stored in one of a PIM operation register and a command register file according to the at least one CMB.

15. The memory device of claim 11, wherein the at least one internal control signal comprises a plurality of internal control signals, wherein the interface circuit is configured to generate the internal control signals to satisfy a read latency (RL) condition defined in a high-bandwidth memory (HBM) specification according to a combination of the command, the address, and the voltage signal when the voltage signal has the first value, and when the command and the address have a first pattern.

16. The memory device of claim 11, wherein the at least one internal control signal comprises a plurality of internal control signals, wherein the interface circuit is configured to generate the internal control signals to satisfy a write latency (WL) condition defined in a high-bandwidth memory (HBM) specification according to a combination of the command, the address, and the voltage signal when the voltage signal has the first value, and when the command and the address have a second pattern.

17. A memory device comprising:

a processor in memory (PIM) circuit including an internal processor configured to perform an internal processing operation; and an interface circuit connected to the PIM circuit, wherein the interface circuit comprises:

a command address decoder configured to decode a command and an address received through a first pin to generate an internal command; and a command mode decoder configured to determine whether the command and the address correspond to a predefined row command/address sequence, and configured to generate at least one command mode bit (CMB) based on the internal command according to the determination result, wherein the interface circuit is configured to control the internal processing operation of the PIM circuit in a PIM operation mode based on the at least one CMB according to the determination result by generating an internal control signal for controlling the PIM circuit based on the command and the address and a voltage signal received through a second pin of the interface circuit, wherein the second pin comprises an external pin enabled in response to an external host device being configured to support use of the external pin for a PIM operation, and a data mask pin enabled in response to the external host device not being configured to support the use of the external pin for the PIM operation.

18. The memory device of claim 17, wherein the second pin corresponds to a reserved for future use (RFU) pin defined in a high-bandwidth memory (HBM) specification, and wherein a logic voltage level of the second pin is low.

19. The memory device of claim 18, wherein the second pin includes a data bus inversion (DBI) pin.

20. The memory device of claim 17, wherein the command mode decoder is configured to use the voltage signal in accordance with a truth table, wherein the interface circuit is configured to control a normal data transaction operation of the PIM circuit in a normal operation mode based on the at least one CMB when the command and the address do not correspond to the predefined row command/address sequence.

* * * * *